Figure 1:
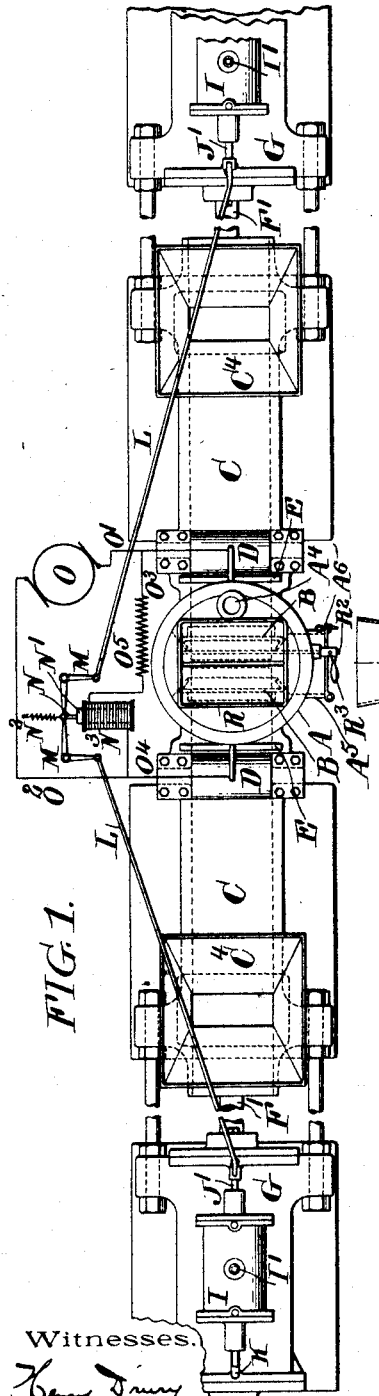

(No Model.)

G. S. STRONG.
ELECTRIC FURNACE.

No. 587,343. Patented Aug. 3, 1897.

Witnesses.

Inventor.

UNITED STATES PATENT OFFICE.

GEORGE S. STRONG, OF NEW YORK, N. Y.

ELECTRIC FURNACE.

SPECIFICATION forming part of Letters Patent No. 587,343, dated August 3, 1897.

Application filed January 20, 1896. Serial No. 576,063. (No model.)

*To all whom it may concern:*

Be it known that I, GEORGE S. STRONG, a citizen of the United States, residing in the city and county of New York, in the State of New York, have invented a new and useful Improvement in the Art of Electric Smelting and in Electric Furnaces, of which the following is a true and exact description, reference being had to the accompanying drawings, which form a part thereof.

My invention relates to the art of electric smelting, and has for its object to at the same time simplify, cheapen, and increase the efficiency of smelting operations carried on by the aid of the electric arc.

As heretofore practiced carbon electrodes have been introduced into a smelting charge contained in a properly-formed furnace and the smelting of the charge effected by means of the heat of the arc formed between the electrodes. Much trouble has, however, been found in this method of smelting, owing to the fact that the fluxes, such as lime or clay, used as a part of the charge have a tendency to flux the carbon of the electrodes as well as the carbon or other material contained in the charge and which they are designed to flux; and a leading feature of my invention consists in forming the electrodes of a mixture of the materials to be smelted in proper proportion, feeding such electrodes into the furnace as they are formed, and then bringing about the smelting of these materials by passing the electric arc from one electrode to the other, the electrode so formed constituting at the same time electrodes and the smelting charge of the furnace.

I form a mixture of the various ingredients in a plastic condition and force this plastic mass into and through openings in the furnace, which serve as holders and guides for the electrodes as well as dies for forming the same. Any convenient binding material may be used for causing the particles of the electrode mixture to cohere, and as the electrodes are formed under considerable pressure and exposed in their guides to a high temperature a very small amount of binding material— such, for instance, as coal-tar or molasses— will serve to give the electrodes as they issue from the holders the necessary coherence and permanence.

If desired, the plastic mass from which the electrodes are formed may consist of only a portion of one or more of the ingredients of the smelting charge, and in this case the remaining ingredient or ingredients should be fed to the furnace in the form of a powder and so that it will be delivered between the electrodes as they approach each other in the furnace. By this plan the smelting charge is still confined to the point at the ends of the electrodes and all ingredients are acted upon simultaneously and in the very arc itself which is formed between the electrodes.

My improvements in the mechanical construction of the electric furnace and, indeed, novel features of my new method of smelting will be best understood as described in connection with the drawings, in which the apparatus is illustrated, and in which—

Figure 2:
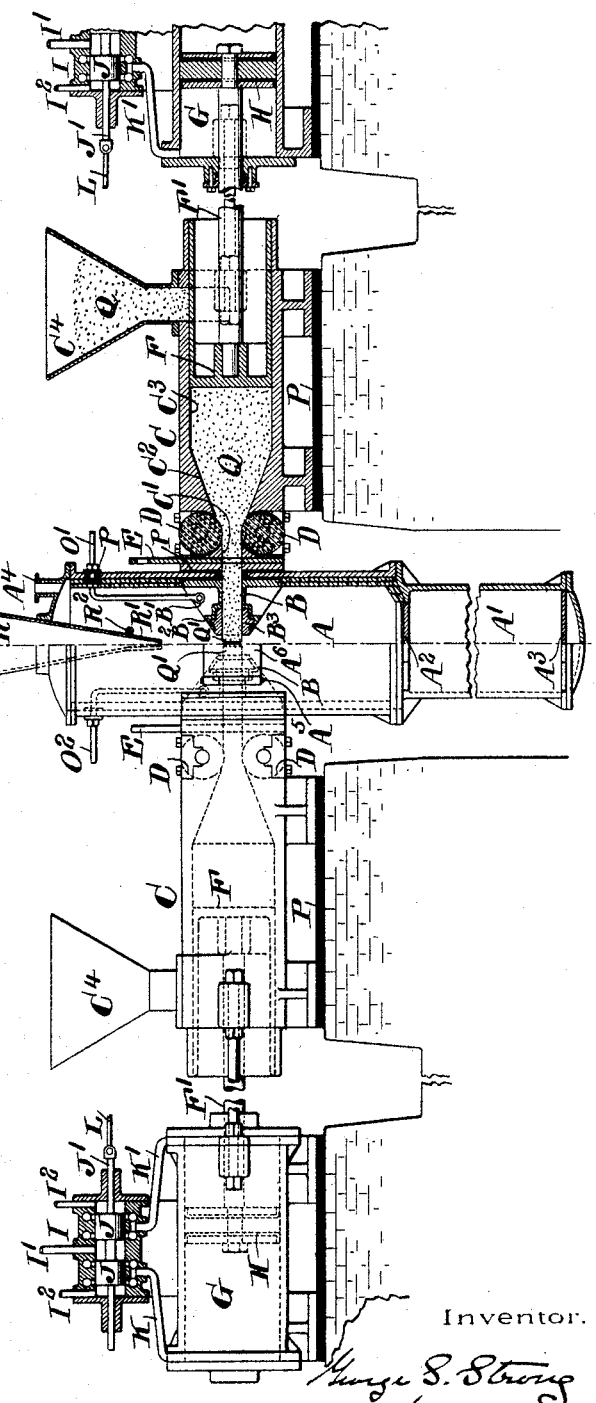

Figure 1 is a plan view of an electric furnace embodying my improvements and adapted for carrying my method into effect; and Fig. 2 is a side elevation of the furnace, partly in central vertical section.

A indicates the furnace proper, A' a chamber for receiving the smelted material, this chamber being situated at the bottom of the furnace and being provided with horizontal gates or valves $A^2$ and $A^3$, the function of which is to permit the withdrawal of the smelted material without admitting air to the furnace. Thus in ordinary operation the valve $A^2$ is open and the valve $A^3$ closed. When it is desired to withdraw the material accumulated in chamber A', the slide $A^2$ is closed and the slide $A^3$ opened. After the withdrawal $A^3$ is closed and $A^2$ opened, the material which has accumulated on top of the slide $A^2$ falling into the chamber A'.

$A^4$ indicates a gas-escape, which may lead to any convenient receptacle for receiving the gases.

$A^5$ is an opening in the side of the furnace provided with a glass door $A^6$, so placed as to come immediately opposite the ends of the electrodes. This permits the inspection of the operation of smelting and also permits the introduction of a saw, by which the electrodes can be severed in case they fuse together.

B B are the holders or guides for the electrodes. They are secured on the inside of the furnace opposite to each other, strengthened, as shown, by webs B', and provided with ends B², adapted to receive and hold linings of refractory material, as indicated at B³, and through which linings the electrodes move into the furnace proper.

C C are cylinders having at their inner ends channels C', which register with the channels in the electrodes B. Farther back these channels flare out, as indicated at C², until they reach the cylindrical wall C³ of the cylinder C.

C⁴ indicates a feed-hopper arranged near the rear ends of the cylinder C and by which material is fed to these cylinders.

D D indicate rollers arranged to work through openings at top and bottom in the cylinder C, and which I consider advisable to assist in the compression and solidification of the plastic mass with which the cylinders are charged.

E E indicate gates by which the channels C' can be closed at will.

F F are pistons working in the cylindrical portion C³ of the cylinder C, and by which a charge of plastic material, (indicated at Q,) after being delivered to the cylinder C from the hopper, is pressed forward in it between the converging walls C², between the rollers D D, into the channels C', and thence, when the gates E are opened, through the electrode-holders B, issuing from the end thereof as electrodes, (indicated at Q'.)

F' F' indicate the piston-rods, which are secured to the pistons F and also to pistons H, working in cylinder G, to which cylinder fluid under pressure is admitted to force the pistons F into the cylinder C or draw them back to permit the introduction of a fresh charge.

As shown, fluid-conduits K and K' pass from the outer and inner ends of the cylinders G to a controlling-valve, (indicated at I J,) through the casings I of which lead pipes I', connecting with an accumulator, (not shown,) and escape-pipes I² I², J J indicating a double valve working in the cylinder I and adapted when moved from central position to connect one end of the cylinder G with the accumulator and the other with an exhaust-port.

J' indicates the valve-stem of the double valve J J, and these valves, as shown, are connected by rods L L with bell-crank levers M M, the free ends of which are connected by a rod or rods N to the armature N' of an electromagnet N³. Said free ends of the levers M M are also connected to a spring (indicated at N²) and which normally draws them upward.

O indicates a dynamo, O' and O² wires of the dynamo-circuit leading to the two electrodes of the furnace, connections being made, as indicated, through the holders B.

O³ O⁴ indicate a shunt-circuit having in it a determined resistance-coil O⁵ and the wire of which forms the winding of the electromagnet N³. By this arrangement it is obvious that an increase of resistance between the electrodes will increase the electric current passing through the shunt. This increase of course energizes the magnet N³, which, acting upon the armature N' and through the levers M M and rods L L, will actuate the double valves J J, causing a shifting of these valves which will admit fluid behind the pistons H and cause them and the piston F to move forward, thus feeding the plastic material Q and the electrodes proper, Q', forward and the electrodes toward each other, this of course diminishing the resistance and permitting the spring N² by its action on the levers M M to shift the valves J and arrest the forward motion until it is needed again by the consumption and smelting of the electrodes.

When it is desired to feed one or more ingredients of the smelting charge into the furnace, I employ a hopper R, the orifice at the bottom of which may be controlled by having the end R' of one side pivoted to a rod R², said rod being controlled as by a handle R³. The position of the hopper is of course such as will cause material fed into it to be delivered directly between the electrodes Q' and in the very heart of the arc between these electrodes.

P P, &c., indicate insulating material which it is advisable to use in the positions indicated, in order to prevent dissipation of the electric current.

My new methods of smelting are peculiarly adapted for the economical production of calcium carbid, in the production of which by known methods there is a large loss of material of the smelting charge. This loss I avoid, and at the same time I effect a more perfect and complete union of the carbon and calcium by making my electrodes of a mixture of lime and powdered carbon, preferably formed and fed into the furnace by pressure, as described above, and excluding air from my furnace, which prevents a useless consumption of carbon by oxidation, and I secure a practically complete union of the calcium and carbon by the heat generated by the arc between the electrodes.

Having now described my invention, what I claim as new, and desire to secure by Letters Patent, is—

1. The improvement in the art of electric smelting which consists in forming electrodes of a mass of material including a material which will bind the mass together under pressure and simultaneously agglomerating, forming, and feeding said mixture forward to a furnace by pressure.

2. The improvement in the art of electric smelting which consists in forming electrodes of a mass of material comprising one or more of the materials used in the smelting operation and a material which will bind the mass together under pressure, simultaneously agglomerating, forming, and feeding said mixture forward to a furnace by pressure and feeding between the electrodes so formed and fed to the furnace further ingredients of the smelting operation in the form of a fine powder.

3. The improvement in the art of electric smelting which consists in forming electrodes of a mass of material including a material which will bind the mass together under pressure, simultaneously agglomerating, forming, and feeding said mixture forward to a furnace by pressure and subjecting said material after it is brought to the desired form and before it actually enters the furnace to the action of a high temperature.

4. The combination of an electric smelting-furnace A with guides as B B for the electrodes, cylinders as C C adapted to contain a plastic mass of electrode-forming material and opening into the electrode-guides and means as pistons F for forcing the plastic material into and through the guides and into the furnace.

5. The combination of an electric smelting-furnace A constructed so as to exclude air from its interior with guides as B B for the electrodes, cylinders as C C adapted to contain a plastic mass of electrode-forming material and opening into the electrode-guides and means as piston F for forcing the plastic material into and through the guides and into the furnace.

6. The combination of an electric smelting-furnace A with guides as B B for the electrodes, cylinders as C C adapted to contain a plastic mass of electrode-forming material and opening into the electrode-guides, means as piston F for forcing the plastic material into and through the guides and into the furnace, and means as hopper R for feeding powdered material between the electrodes.

7. The combination of an electric smelting-furnace A with guides as B B for the electrodes, cylinders as C C adapted to contain a plastic mass of electrode-forming material and opening into the electrode-guides, means as pistons F for forcing the plastic material into and through the guides and into the furnace, cylinders and pistons G H for actuating the piston F, valves as I J arranged to effect the admission and discharge of fluid to the cylinders, an electric circuit of which the electrodes form a part, a resistance-shunt in said circuit, an electromagnet the coils of which are formed of the wire of said shunt and an armature actuated by said magnet and connected to the valves I J as described and so as to actuate the said valves and parts controlled thereby as the resistance through the electrode-circuit varies.

GEORGE S. STRONG.

Witnesses:
CHARLES F. ZIEGLER,
D. STEWART.